G. C. ELLWOOD.
DEVICE FOR DETECTING WAVES IN WIRELESS TELEGRAPHY.
APPLICATION FILED JUNE 18, 1909.
967,118.
Patented Aug. 9, 1910.
2 SHEETS—SHEET 1.
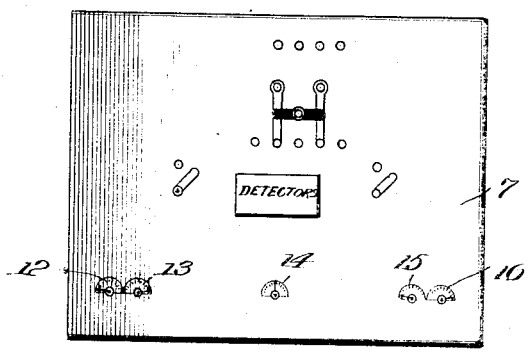
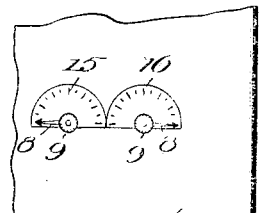
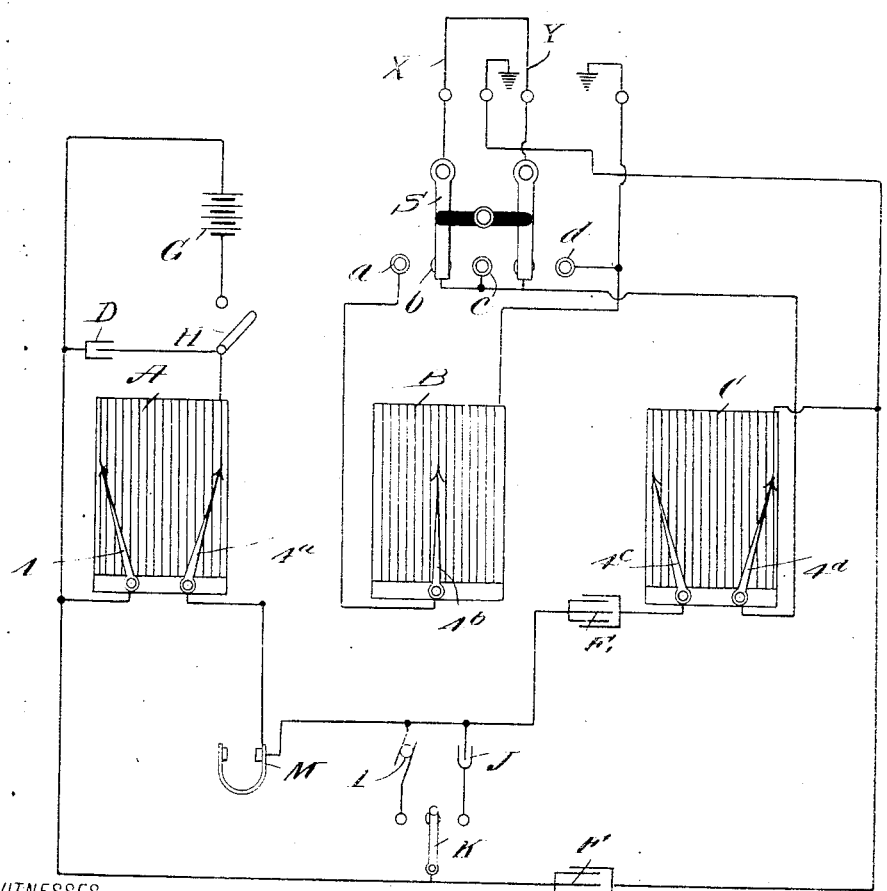

G. C. ELLWOOD.
DEVICE FOR DETECTING WAVES IN WIRELESS TELEGRAPHY.
APPLICATION FILED JUNE 18, 1909.
967,118.
Patented Aug. 9, 1910.
2 SHEETS—SHEET 2.
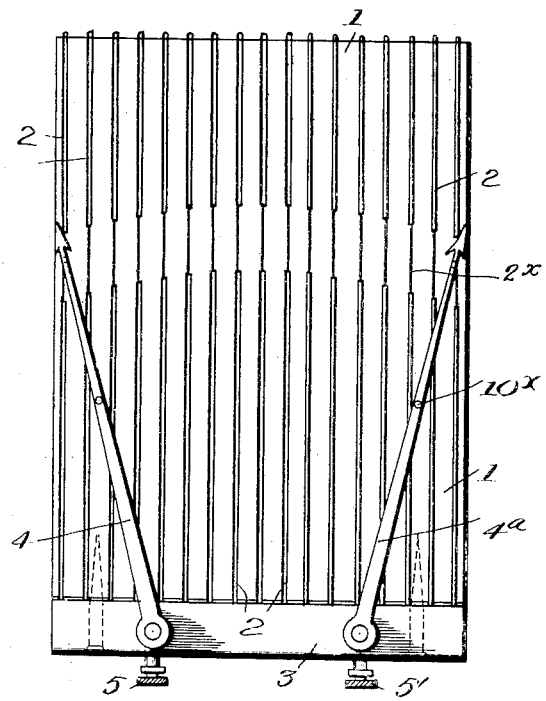
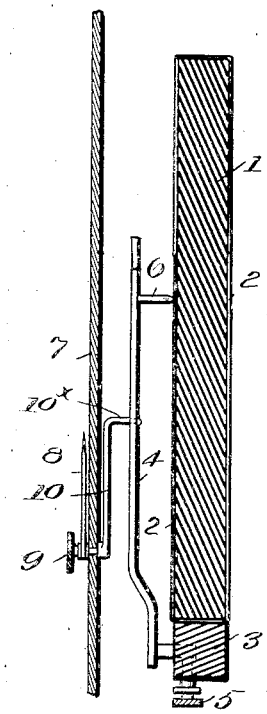
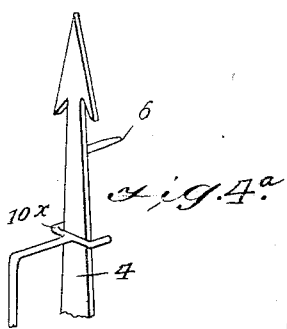
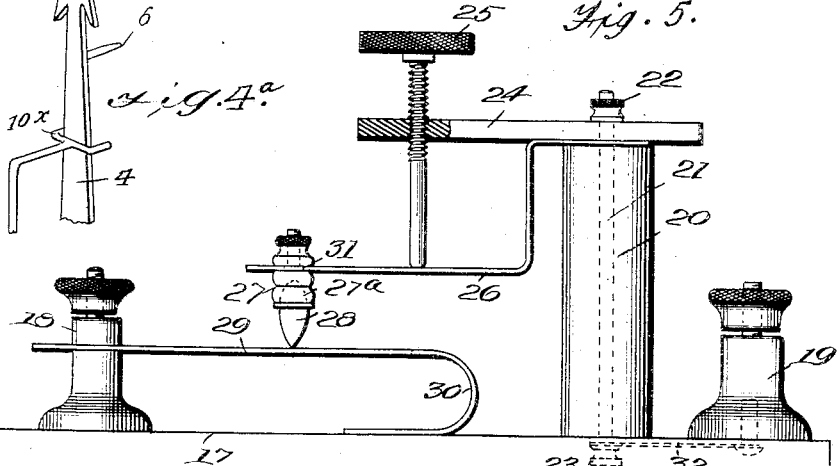
WITNESSES
F. C. Barry
L. A. Stanley
INVENTOR
GEORGE C. ELLWOOD
BY Munn & Co.
ATTORNEYS

UNITED STATES PATENT OFFICE.

GEORGE C. ELLWOOD, OF ARBUCKLE, CALIFORNIA.

DEVICE FOR DETECTING WAVES IN WIRELESS TELEGRAPHY.

967,118.　　　Specification of Letters Patent.　Patented Aug. 9, 1910.

Application filed June 18, 1909. Serial No. 502,922.

*To all whom it may concern:*

Be it known that I, GEORGE C. ELLWOOD, a citizen of the United States, and a resident of Arbuckle, in the county of Colusa and State of California, have made certain new and useful Improvements in Devices for Detecting Waves in Wireless Telegraphy, of which the following is a specification.

My invention relates to improvements in receiving devices for the detection of waves in wireless telegraphy and it consists in the constructions, combinations and arrangements herein described and claimed.

An object of my invention is to provide a receiving system in which the apparatus may be tuned by means of variable resistances and inductances.

A further object of my invention is to provide an improved form of variable inductances in which indicators may be set at the proper place to cut in or out coils and to give the desired inductance.

Other objects and advantages will appear in the following specification and the novel features of the device will be particularly pointed out in the appending claims.

My invention is illustrated in the accompanying drawing in which—

Figure 1 shows a top view of a receiving instrument constructed according to my invention; Fig. 1ª is an enlarged detail view of a portion of the top of the receiving instrument. Fig. 2 is a diagrammatic view showing the arrangement of the circuits of the receiver; Fig. 3 is a plan view showing the construction of the variable resistances and inductances, the cover being removed; Fig. 4 is a vertical section through a variable resistance and inductance showing the relation of the swinging arm to the indicator arm, and Fig. 4ª is a detail perspective view of an indicating arm. Fig. 5 is a side view partly in section of the detector.

Before touching upon the circuit arrangements of the receiver station, I will describe in detail the construction of the variable resistances and inductances by which the tuning of the device is accomplished.

Referring now to Figs. 3 and 4, I have shown therein one of the resistance and inductance elements and the manner in which it is constructed. It consists of a block or plate of non-conducting material 1, which is preferably of rectangular shape. Around this block is wound a series of coils of insulated wire 2. At one end of the block is a strip 3 of non-conducting material to which is pivoted the arms 4, and 4ª which are in electrical connection with the binding posts 5 and 5'. The arms 4 and 4ª have at their forward ends a downwardly projecting stud 6, with a flexible end which is arranged to engage the wires 2 as the arm is swung from side to side. In order for the stud 6 to make an electrical connection between the arm 4 and the wires 2 the insulation of the latter is cut away at $2^x$ as is clearly shown in Fig. 3. The block thus described is placed within a proper receptacle having a cover 7. Pivotally secured to the outer side of the cover is an indicating pointer 8 which is provided with a milled thumb wheel 9. Attached to the end of the thumb wheel shaft on the inner side of the receptacle is an arm 10 having a forked end $10^x$ through which the arm 4 extends. It will thus be seen that by turning the wheel 9 the pointer 8 may be set at any position on a scale. These scales are shown on the upper side of the cover 7 of the receptacle at 12, 13, 14, 15 and 16 respectively. The scale 12, is a part of the potentiometer A, see Fig. 2, and is for the purpose of affording a variable resistance when the coil lever 4 is moved. The scale 13 is for the purpose of indicating the resistance when the lever 4ª is moved. The scale 14 is for indicating the inductance when the lever 4ᵇ of the coil B is shifted, while the circuits 15 and 16 are for use with the tuning coil C.

In Fig. 5, I have shown a preferred form of detector, although other forms might be used. It consists of an insulating base 17 upon which are mounted two binding posts 18 and 19. At 20 is a hard rubber supporting post which is held by means of a conducting rod 21 running through its center, the latter being provided with two nuts 22 and 23 at each end. The former nut holds the arm 24 which bears an adjusting screw 25. Between the arm 24 and the standard 20 is clamped a piece of spring brass 26 bent in a Z-shaped form, on the end of which is a silicon holder 27 which is made by taking a binding post and hollowing out the lower part as shown at 27ª and inserting a piece of silicon, silver telluride or other similar substance 28 and running in solder to hold the latter in place. At 29 I have shown a copper ribbon which is secured at one end to the binding post 18 and then bent in a half circle at 30 with the bottom resting on the base 17 thus allowing plenty of spring between the binding post 18 and the part 30 of a Z shaped brass spring 26. The spring brass has a slit 31 through which a portion of the silicon holder passes. The binding post 19 is connected with the rod 20 by means of the conductor 32.

Fig. 2 shows the circuit arrangement for the receiving station. The coils A, B, and C are arranged as shown in the drawing. At X and Y, are shown the two aerial terminals which are connected at their tops and which lead to the aerial and ground switch S. $a$, $b$, $c$, and $d$ are contact points for the switch S. D, E, and F are condensers. G is the battery which is cut in or out by means of a switch H. I and J are shown as detectors, either of which may be brought into use by the switch K. The operator's head set is shown at M.

From the foregoing description of the various parts of the device, the operation thereof may be readily understood.

By experience, I have found that with the arrangement described above, the tuning of the receiving set is more easily accomplished, than with any other arrangement with which I am acquainted. It will be apparent that by moving the switch S to the right or to the left, the inductance coils C and B may be cut in or out at will, thus adding to the facility with which the set may be tuned.

The coil C can be used singly especially for stations close in, that is, between 100 and 200 miles. The coil B is used when the stations are distant over 200 miles. It also serves to cut out static and other interferences. By placing switch S to the right, the coil C is cut in in one aerial terminal and the ground is connected with the other aerial terminal, the ground acting as a large condenser. By turning the switch S to the left, the coil B is cut in, which gives a more extended aerial and still allows the circuit through the ground, which acts as a condenser. By placing the switch S at the central position, the coil B is cut out. Both aerial terminals then connect with the lever $4^a$ thence to coil C. Coil A serves as a resistance. By moving lever 4 or $4^a$ resistance is added or decreased. The coil B has only one lever on the coil. One end is left free, while the other end is grounded. Lever $4^b$ cuts in and out wire, thereby increasing or decreasing the wave length. Coil C has two levers, $4^c$ and $4^d$. Lever $4^d$ cuts in and out wire, thereby lengthening or shortening the wave length when used with or without the coil B.

In operating the device, the aerial switch is first thrown in and then the battery switch H is manipulated. The thumb screw 25, (see Fig. 5) is now turned down so that the silicon point 28 rests on the copper ribbon 31 lightly. The lever $4^a$ of the coil A is moved to the right, until a grinding noise is heard. Then the lever is moved toward the left until the grinding noise just disappears. By having the lever $4^d$ about one and one-half inches to the left of the coil and the lever $4^c$ to the right of the left-hand end of the coil almost any signals can be heard faintly. Then by regulating the levers $4^c$ and $4^d$ the device can be tuned so as to be readable. The primary circuit is from the aerial to the lever $4^d$ and through the coil C to the ground. The secondary circuit is through lever $4^c$, through condenser E, detectors I or J, condenser F, back to coil C. The other secondary circuit is from the detectors I or J, through the telephone M to lever $4^a$ through the potentiometer A to lever 4 and back to switch K.

I claim:

1. In a receiving instrument for wireless telegraphy, a pair of aerial terminals connected at their upper ends, a pair of inductances, both of said inductances being grounded, and a switch for connecting both of said terminals to one inductance, when in one position, for connecting each of said terminals to a different one of said inductances when in another position, and for connecting one of said terminals to one of said inductances, and the other of said terminals to ground, when in a third position.

2. In a wireless receiving set, a pair of aerial terminals connected at their tops, a switch having a pair of pivoted conducting members and an insulating handle for moving said conducting member simultaneously, a series of five contacts, a pair of variable inductances each of said inductances being grounded, one of said inductances being connected to three of said contacts, the other inductance being connected to one of said contacts and the remaining contact being grounded.

GEORGE C. ELLWOOD.

Witnesses:
J. D. SHERER,
W. R. ELLWOOD.